June 2, 1936. M. P. BLOMBERG 2,042,765
CONDUIT CONNECTION BETWEEN CAR BODIES
Filed March 26, 1934 2 Sheets-Sheet 1

Inventor
Martin P. Blomberg

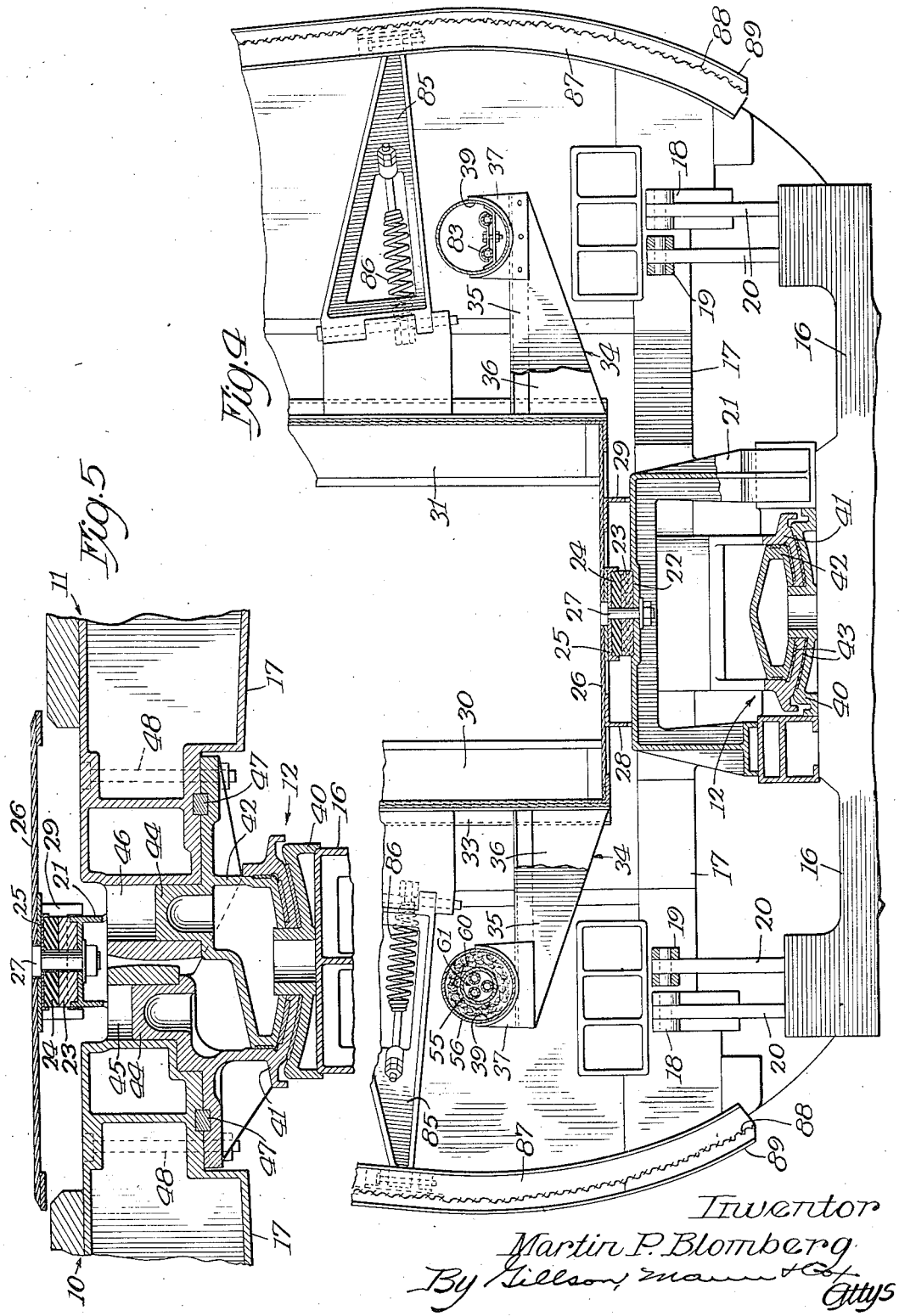

Patented June 2, 1936

2,042,765

UNITED STATES PATENT OFFICE 2,042,765

CONDUIT CONNECTION BETWEEN CAR BODIES

Martin P. Blomberg, Chicago, Ill., assignor to Pullman-Standard Car Manufacturing Company, Chicago, Ill., a corporation of Delaware Application March 26, 1934, Serial No. 717,418

9 Claims. (Cl. 105—8)

The principal object of this invention is to provide a protected passageway or conduit for water piping, air hose, signal pipe, conditioned and return air, and the like, between car bodies having relative movement. The illustrative embodiment of the invention shows its application to an articulated car, but its use is not thus limited.

Further and other objects and advantages will become apparent as the disclosure proceeds and the description is read in conjunction with the accompanying drawings, in which Fig. 1 is a plan section through adjacent car bodies of an articulated car showing protected conduits made in accordance with this invention;

Fig. 4 is a fragmentary, vertical, sectional view taken on the line 4—4 of Fig. 1; and Fig. 5 is an enlarged detail view showing the articulated joint.

Figure 1:
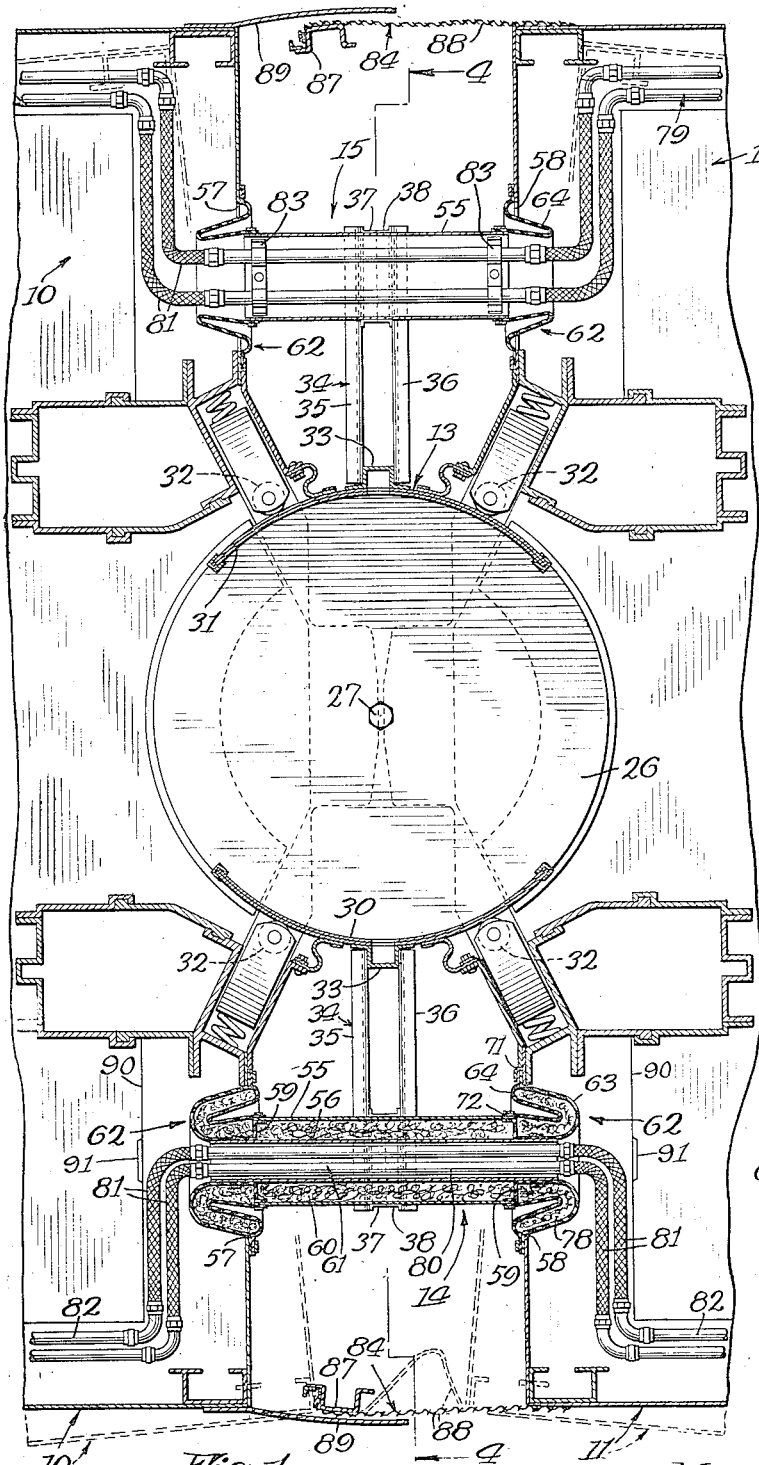

The invention is capable of many embodiments, the one shown and described being merely illustrative.

Adjacent car bodies of an articulated car are indicated generally at 10 and 11, their articulated connection at 12, a vestibule diaphragm assembly at 13, and conduits 14 and 15 for carrying the water pipes, air hose, signal lines, etc. from one car body to the other.

A truck bolster, indicated diagrammatically at 16, supports the articulated joint 12, the bolster being mounted on the truck frame, not shown, in a conventional manner. See Car Builders' Dictionary, 1931, pages 569, 783–788 for illustration.

The end sills 17, 17 of adjacent car bodies are equipped with offset inwardly extending arms 18 and 19, resiliently connected by links 20 to the truck bolster 16. The details of the connection are of no importance here.

A yoke 21 of sturdy construction rises from the center portion of the bolster and forms an arch over the articulated joint. The top of the yoke is slightly recessed at 22 to receive a wooden block 23 and a hard rubber block 24, the latter being capped with a shield 25 that is riveted to the underside of the vestibule floor 26.

The circular floor 26 of the vestibule drum assembly 13 rests upon the blocks 23 and 24 and is secured to the yoke by a bolt 27. Angles 28 and 29, astride the yoke, permit the floor 26 to have limited tilting movement with respect to the yoke, but restrain excess movement, and prohibit rotation relative to the truck bolster.

Rising from the drum floor 26 are arcuate side plates 30 and 31 which form the side walls of the vestibule passageway. The walls are securely fastened to the circular floor 26 and are guided by spring pressed rollers 32, as indicated in Fig. 1. There are three sets of rollers (four in each set), at different heights, to hold the drum in vertical position, although only one set is shown in the drawings.

The outer faces of the side plates 30 and 31 are equipped with vertical channels 33, each of which carries an outwardly extending arm, or bracket 34. The bracket is formed in two parts 35 and 36, the inner ends being secured to the channels 33 and the outer ends being spaced apart by conduit supports 37 and 38 having concave upper surfaces 39 for receiving the conduits 14 and 15.

The articulated joint 12 consists of a truck center plate 40 secured to the truck bolster 16, an outer center plate bracket 41 secured to one of the end sills, and an inner center plate bracket 42 secured to the other end sill. The center plate brackets 41 and 42 are each equipped with spherical bearing surfaces which mate with one another and with the truck center plate to form an articulated joint. The bearing surfaces are separated by self-lubricating material 43, which comprises porous metal impregnated with a lubricant.

The center plate brackets 41 and 42 are each equipped with knobs 44 which enter recesses 45 and 46 in the end sills. Keys 47 prevent the center plate brackets from turning with reference to the end sills, and bolts 48 attach them in place.

The brackets 34, supporting the conduits 14 and 15, move at all times with the truck bolster although the resilient connection between the floor 26 and the yoke 21 allows for some relative vertical movement.

The conduit 14, which in the present embodiment of the invention is used for carrying the water pipes from one car body to the other, comprises an aluminum tube 55 which rests on and is secured to the supports 37 and 38. A small aluminum tube 56 is concentrically arranged within the outer tube and projects beyond the ends of the outer tube 55 and through the openings 57 and 58 in the end walls of the car bodies.

The openings 57 and 58 are aligned and are of substantially greater diameter than the outer tube 55 to permit the conduit assembly to enter the car bodies as the car is rounding a curve.

The inner tube 56 is maintained in its concentric relation to the outer tube by spacers 59 which are Z-shaped in cross section. The annular space between the inner and outer tubes, is packed with insulating material 60 to prevent the water pipes, generally designated 61, from freezing during cold weather.

Since the car bodies converge on one side and diverge on the other when rounding a given curve, and vice versa when rounding a curve in the other direction, it is necessary for the connection between the conduits 14 and 15 and the car bodies to be both extensible and contractible. In the embodiment shown, the desired action is obtained by providing flexible diaphragms 62 which for the conduit 14 comprise double-walled flexible connections made up of annular rubber pieces 63 and 64 secured to the end walls of the car bodies at 71 and to the conduit 14 at 72 and 73. An annulus 74 secures the piece 63 to the inner tube 56; an annulus 75 secures the piece 64 to the outer tube 55; and an annulus 76 bolted or otherwise secured to the margin of the openings 57 and 58 clamps the remaining unbound edges against the end walls of the car bodies. The space enclosed by the double-walled diaphragm is filled with suitable insulating material 78.

The conduit 15 is identical in all respects with the conduit 14 except that the inner tube 56 and spacers 59 are omitted, and only the rubber piece 64 is used in the diaphragm connection. The simplified construction is used as the signal pipes 79 do not require insulation.

Figure 2:
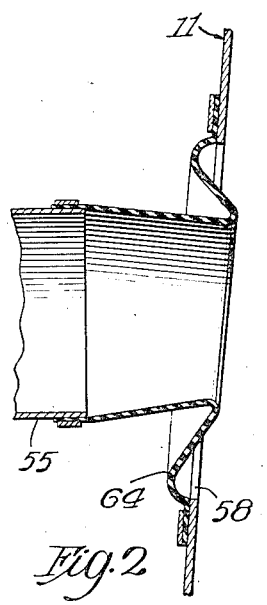
Fig. 2 is a fragmentary sectional view showing the diaphragm connection between one of the conduits and the car end distended.
Figure 3:
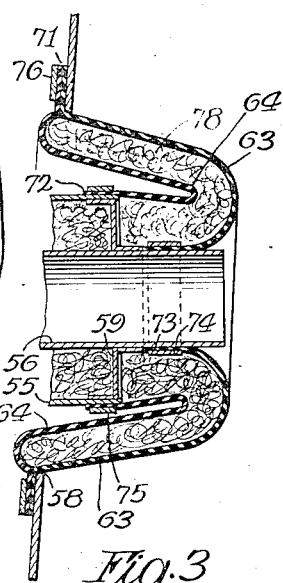
Fig. 3 is a fragmentary, sectional view showing the diaphragm connection for the lower conduit (Fig. 1) when the car bodies approach one another.

In Fig. 1, the dotted lines indicate the relative position of the car bodies when the car rounds a curve to the left, assuming that the car is moving to the left. As shown, the ends of the conduit 14 move through the openings 57 and 68, and cause the diaphragms 62 to distend (Fig. 3). The conduit 15, on the other hand, is extended, as shown in Fig. 2.

Preferably common pipe is used within the conduits 14 and 15, as indicated at 80, and the ends are joined by armored hose 81 to the ends of the water pipe 82 and signal pipe 79, respectively, within the car bodies. The armored hose has the necessary flexibility to accommodate the relative movement of the car bodies when rounding a curve. Preferably the pipe in the conduit 15 is held down by clamps 83 to prevent rattling.

The pipe and hose connections between car bodies are further protected from the elements by a flexible fly 84, supported by brackets 85, carried by the vestibule assembly 13, and urged forwardly by springs 86 to form a canopy over the space between the car bodies. The fly includes an arched bow 87, conforming in shape to the cross section of the adjacent car bodies, and to which the flexible fabric 88 of the fly is secured. A metal shed 89 extending rearwardly from the leading car section overlaps the fly and completes the canopy enclosure.

To further assist the insulated conduit 14 in preventing water from freezing in the pipes 80, the interior finish, indicated at 90, is provided with louvres 91, or other openings, so that a circulation of air may be maintained from one car body to another through the space between the water pipes.

It is not essential that the connecting duct be supported on the car truck, for in some cases it is more convenient and desirable to support it solely from one or both of the car bodies.

The conduit connection is particularly useful when a train or multi-sectioned car is air conditioned by the head end system, or a similar system in which conditioned and/or return air is passed from one car body to another.

What I claim, therefore, is:—

1. In combination with articulated car sections including a truck bolster adapted to support adjacent ends of the sections, a relatively rigid tube carried by the bolster in substantially horizontal position between the car sections, and means for connecting the ends of the tube to openings in the adjacent sections, said means being both extensible and contractible to accommodate relative movement of the car sections.

2. In combination with articulated car sections having alined openings at adjacent ends, a relatively rigid tube mounted in substantially horizontal position with its ends in proximity to the openings, and flexible connections joining the ends of the tube to the openings to exclude outside air, said connections being both extensible and contractible to accommodate relative movement of the car section.

3. In combination with articulated car sections including a truck bolster adapted to support adjacent ends of the sections, a yoke carried by the bolster, a vestibule drum on the yoke, an arm projecting laterally from the drum, a relatively rigid tube supported by the arm, and means for flexibly connecting the ends of the tube to the wall around the openings to accommodate limited relative movement between the car sections.

4. In combination with adjacent car bodies having alined openings in their end walls, a relatively rigid tube mounted horizontally between the car bodies with its ends in proximity to the openings, and flexible connections joining the ends of the tube with the margin of the openings.

5. In combination with adjacent car bodies having alined openings in their end walls, a relatively rigid tube mounted horizontally between the car bodies with its ends in proximity to the openings, flexible connections joining the ends of the tube with the margin of the openings, an inner tube concentrically supported within the outer tube, and insulation in the annular space between the tubes.

6. In combination with adjacent car bodies having alined openings in their end walls, a relatively rigid tube horizontally mounted between the car bodies with its ends in proximity to the openings, said openings being of larger diameter than the tube so that the latter may pass into the openings when the car bodies move toward one another, and means for preventing the air from entering the car bodies through the space surrounding the tubes.

7. In combination with adjacent car bodies having alined openings in their end walls, a relatively rigid tube horizontally mounted between the car bodies with its ends in proximity to the openings, said openings being of larger diameter than the tube so that the latter may pass into the openings when the car bodies move toward one another, and diaphragms for closing the spaces between the tube and the margins of the openings.

8. In combination with adjacent car bodies having alined openings in their end walls, a relatively rigid tube horizontally mounted between the car bodies with its ends in proximity to the openings, said openings being of larger diameter than the tube so that the latter may pass into the openings when the car bodies move toward one another, double-walled diaphragms closing the space between the tube and the margins of the openings, and insulating material between the double walls.

9. In combination with adjacent car bodies having alined openings in their end walls, a relatively rigid tube mounted horizontally between the car bodies with its ends in proximity to the openings, flexible connections joining the ends of the tube with the margin of the openings, an inner tube concentrically supported within the outer tube, insulation in the annular space between the tubes, water pipes mounted within the inner tube with a space left for air circulation, said space being in communication with the interior of the car bodies.

MARTIN P. BLOMBERG.